Figure 5:
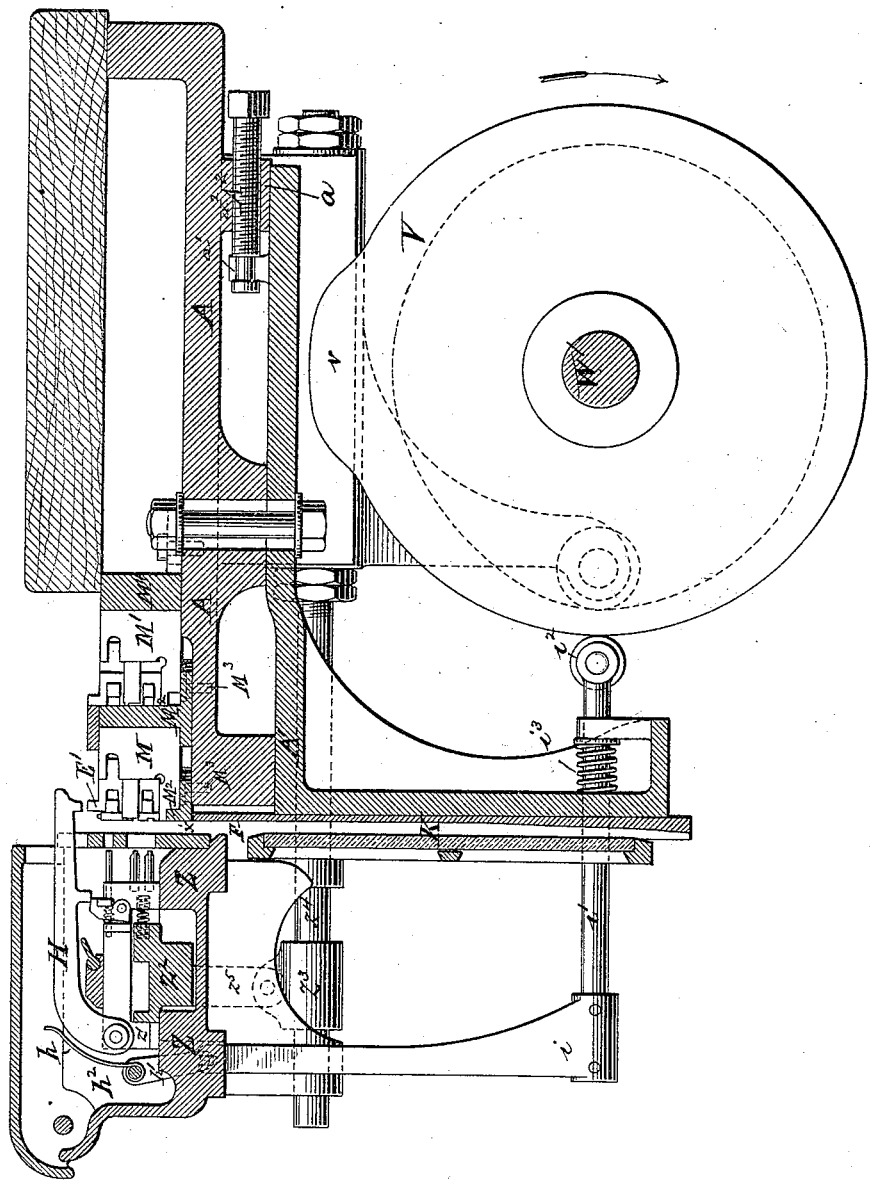

(No Model.) 7 Sheets—Sheet 1.
L. K. JOHNSON.
TYPE DISTRIBUTING MACHINE.
No. 526,106. Patented Sept. 18, 1894.
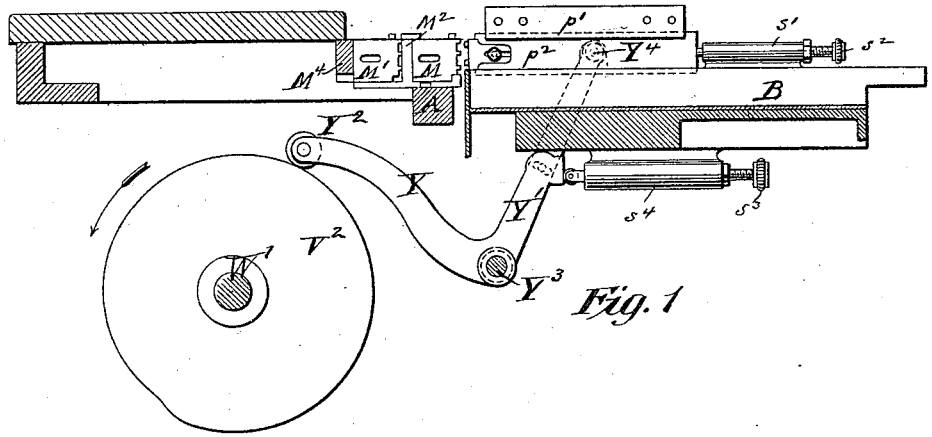
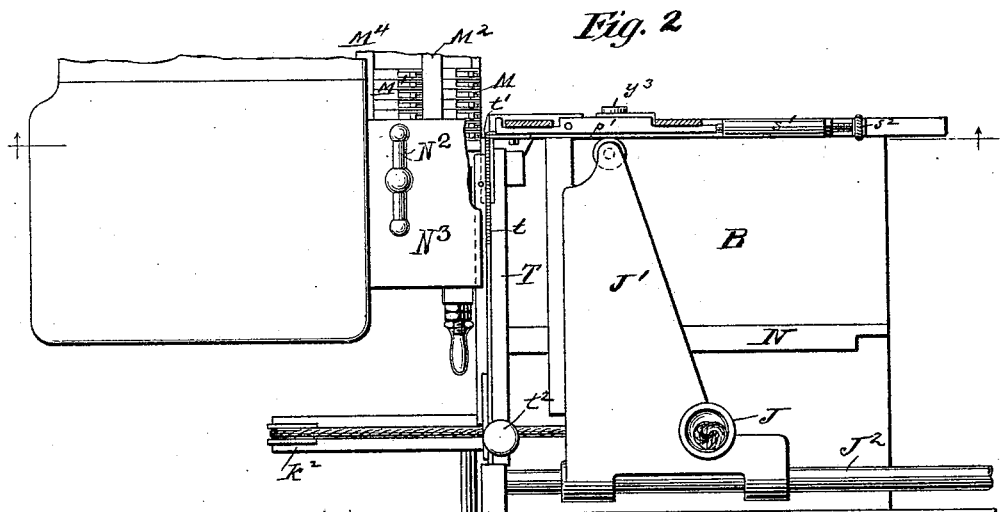
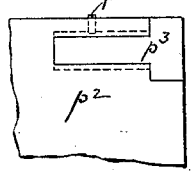
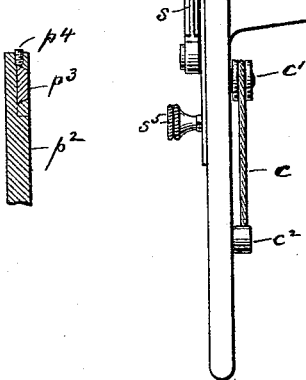
Witnesses
C. E. Ashley
H. W. Lloyd
Inventor
Louis K. Johnson
By his Attorney
Willard Parker Butler (No Model.)  L. K. JOHNSON.  7 Sheets—Sheet 2.
TYPE DISTRIBUTING MACHINE.

No. 526,106.  Patented Sept. 18, 1894.

Witnesses  Inventor
C. E. Ashley  Louis K. Johnson
H. W. Lloyd  By his Attorney
Willard Parker Butler (No Model.)
7 Sheets—Sheet 3.

L. K. JOHNSON.
TYPE DISTRIBUTING MACHINE.

No. 526,106.   Patented Sept. 18, 1894.

(No Model.)  7 Sheets—Sheet 4.
L. K. JOHNSON.
TYPE DISTRIBUTING MACHINE.
No. 526,106. Patented Sept. 18, 1894.
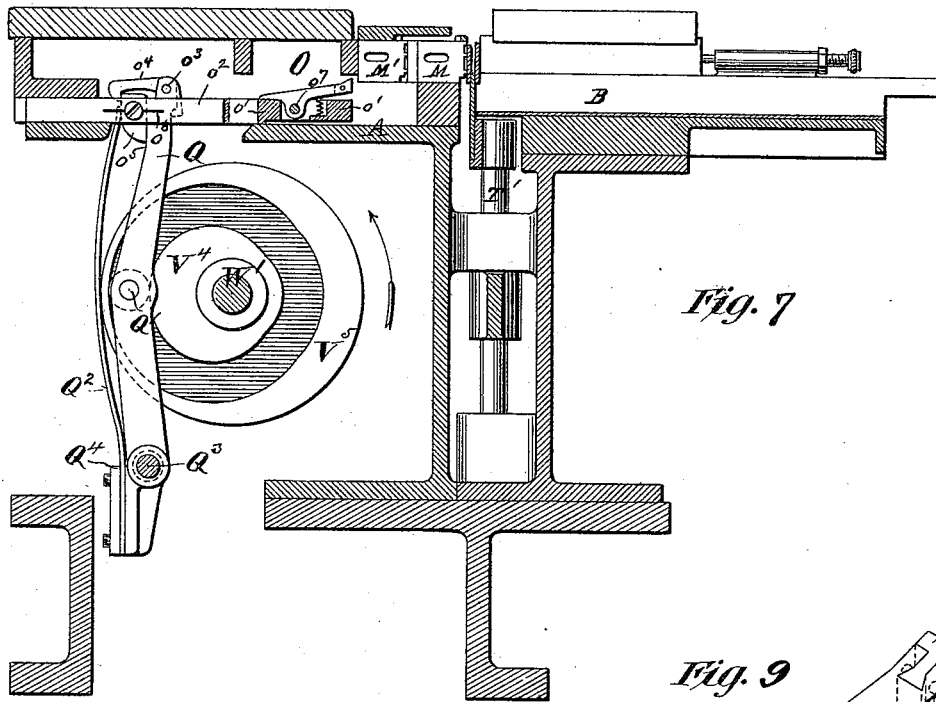
Fig. 7
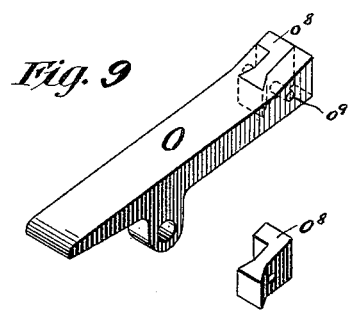
Fig. 9
Fig. 8
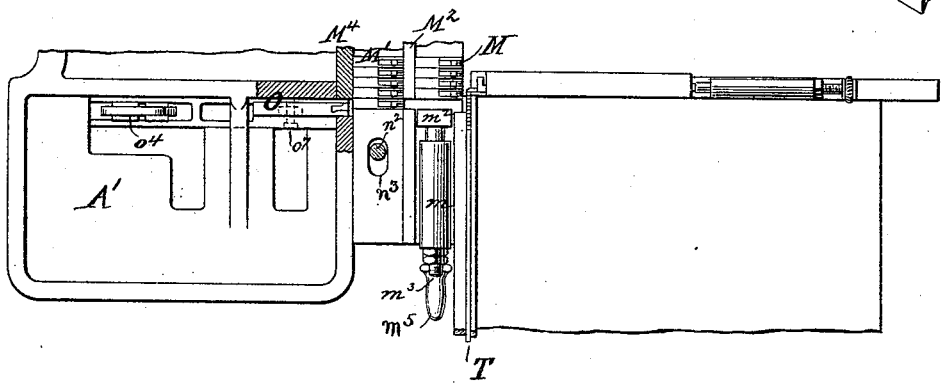
Witnesses
C. E. Ashley
H. W. Lloyd
Inventor
Louis K. Johnson
By his Attorney
Willard Parker Butler (No Model.) 7 Sheets—Sheet 5.
L. K. JOHNSON.
TYPE DISTRIBUTING MACHINE.
No. 526,106. Patented Sept. 18, 1894.
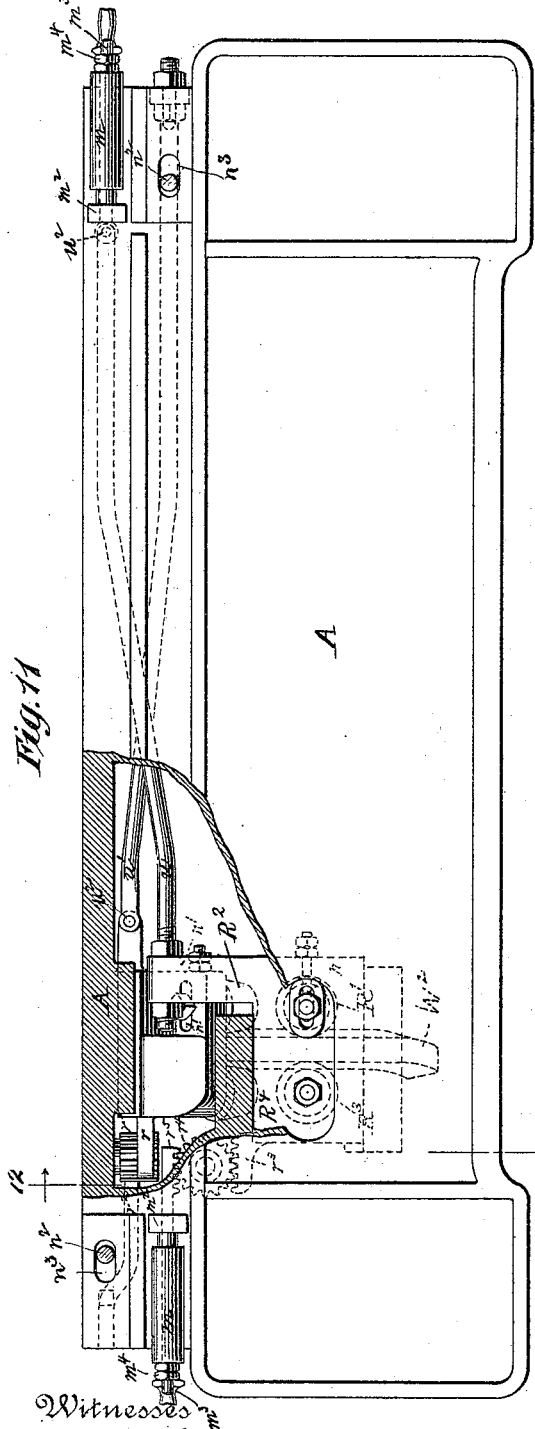
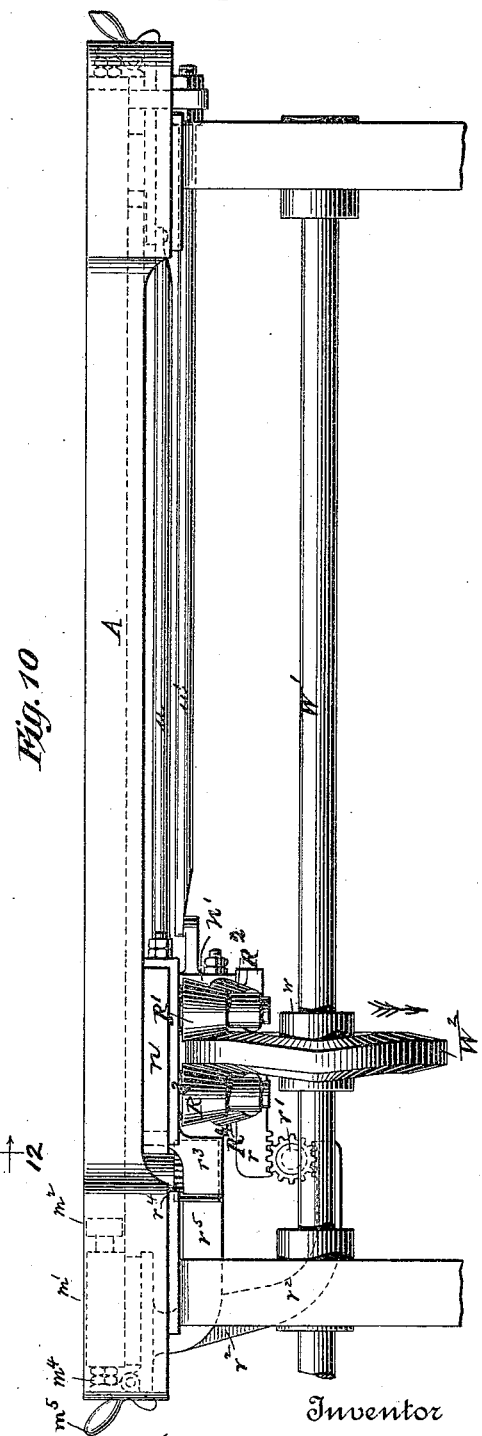
Witnesses
C. E. Ashley
H. W. Lloyd.
Inventor
Louis K. Johnson
By his Attorney
Willard Parker Butler (No Model.)  7 Sheets—Sheet 6.

L. K. JOHNSON.
TYPE DISTRIBUTING MACHINE.

No. 526,106.  Patented Sept. 18, 1894.

Witnesses
C. E. Ashley
H. W. Lloyd

Inventor
Louis K. Johnson
By his Attorney
Willard Parker Butler (No Model.) 7 Sheets—Sheet 7.

L. K. JOHNSON.
TYPE DISTRIBUTING MACHINE.

No. 526,106. Patented Sept. 18, 1894.

Witnesses
C. E. Ashley
H. W. Lloyd

Inventor
Louis K. Johnson
By his Attorney
Willard Parker Butler

UNITED STATES PATENT OFFICE.

LOUIS K. JOHNSON, OF BROOKLYN, NEW YORK, ASSIGNOR, BY MESNE ASSIGNMENTS, TO THE EMPIRE TYPE-SETTING MACHINE COMPANY, OF WEST VIRGINIA.

TYPE-DISTRIBUTING MACHINE.

SPECIFICATION forming part of Letters Patent No. 526,106, dated September 18, 1894.

Application filed May 22, 1893. Serial No. 475,061. (No model.)

*To all whom it may concern:*

Be it known that I, LOUIS K. JOHNSON, a citizen of the United States, and a resident of the city of Brooklyn, county of Kings, and State of New York, have invented a new and useful Improvement in Type-Distributing Machines, of which the following is a specification.

My invention relates to improvements in type distributing machines, and particularly to that class of type distributing machines which were invented originally by C. W. Dickinson, subsequently improved upon by William A. Lorenz and myself, and heretofore secured by Letters Patent of the United States, No. 174,899, dated March 21, 1876, and No. 174,900, dated March 21, 1876, issued upon the application of Charles W. Dickinson; No. 174,915, dated March 21, 1876, issued upon the application of William A. Lorenz; No. 244,721, dated July 19, 1881, issued upon the application of Louis K. Johnson, and No. 244,725, dated July 19, 1881. issued upon the application of William A. Lorenz and Louis K. Johnson; and the same more particularly relates to improvements in certain parts of the mechanism of the machines described in the aforesaid several Letters Patent. The object of the said improvements is to increase the efficiency and smoothness of operation of type-distributers of the character of that described and claimed in the two first aforesaid Letters Patent, issued upon the application of Charles W. Dickinson. My first improvement has reference to the construction of the plunger used in the form of machine particularly described in Letters Patent of the United States, No. 244,725, granted to William A. Lorenz and Louis K. Johnson on the 19th day of July, 1881, for moving the row of carriers forward from one raceway to another.

The second improvement relates to the method of constructing the raceways for the carriers, whereby the same may be readily adjusted as the carriers and abutments of the raceway become worn.

The third improvement relates to the construction of spring devices for more certainly or positively holding or throwing the feeler hooks down and causing them to engage with absolute certainty with the ejectors of the carrier.

The fourth improvement relates to an improvement in the construction of the type driver, and more particularly for replacing that portion of the same which gradually becomes worn by the operation of the machine.

The fifth improvement relates to the construction of the plunger mechanism for moving the carriers longitudinally in their raceways and preventing jarring of the carriers at ends of the raceways as the same are moved.

The sixth improvement relates to an adjustment of the apparatus for conducting the type from the carrier to the case below, so as to correspond to the adjustment of the forward edge of the raceway in which the carriers travel.

The invention will be best understood by reference to the accompanying seven sheets of drawings, forming a part of this specification, in which—

Figure 6:
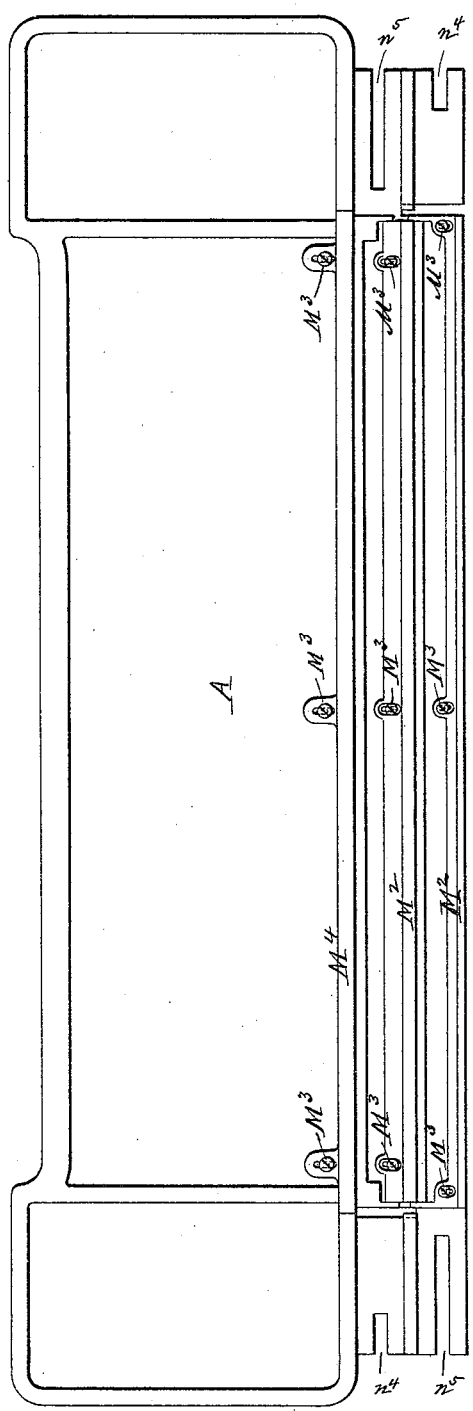
Figure 12:
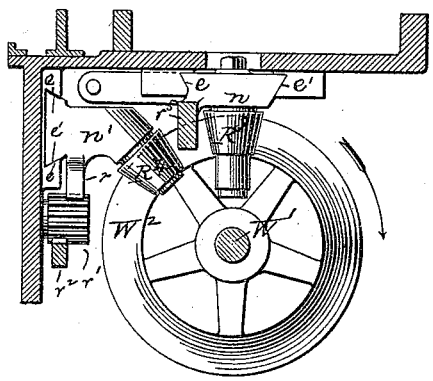
Figure 13:
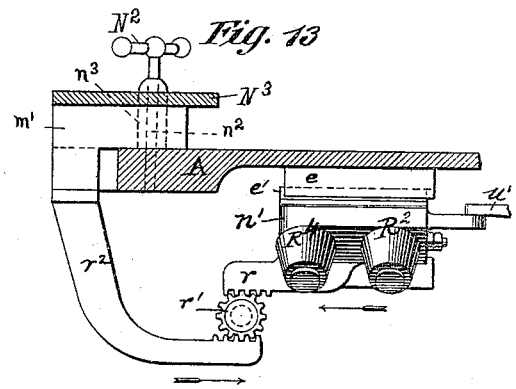
Figures 14, 15:
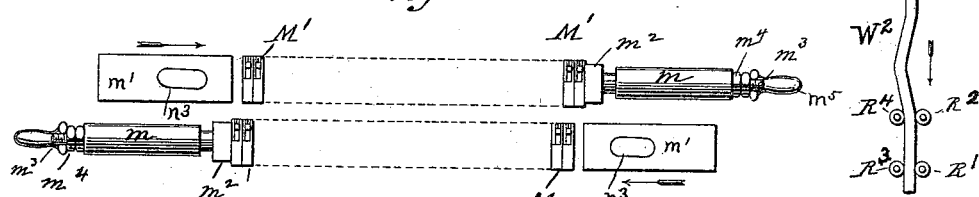
Figure 16:
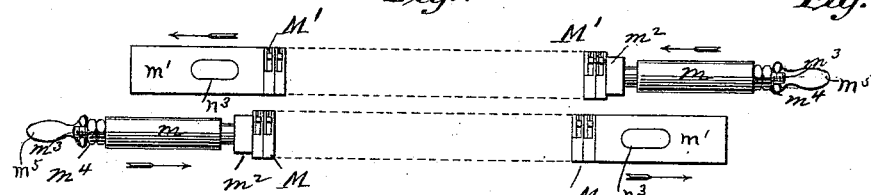
Figure 17:
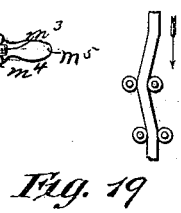
Figure 18:
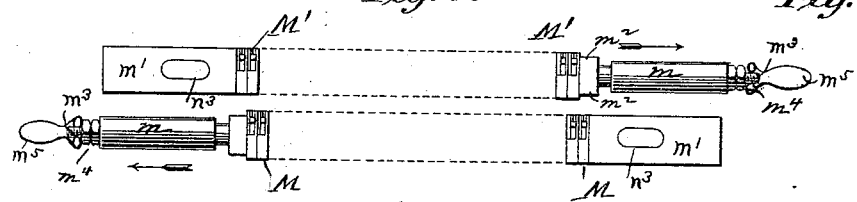
Figure 19:
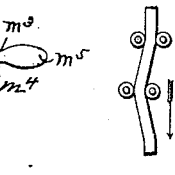
Figure 20:
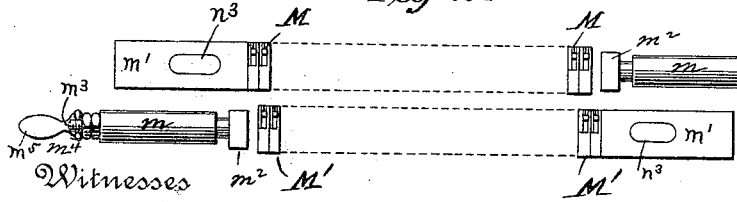
Figure 21:
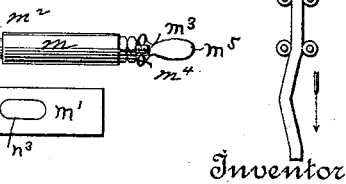
Figure 22:
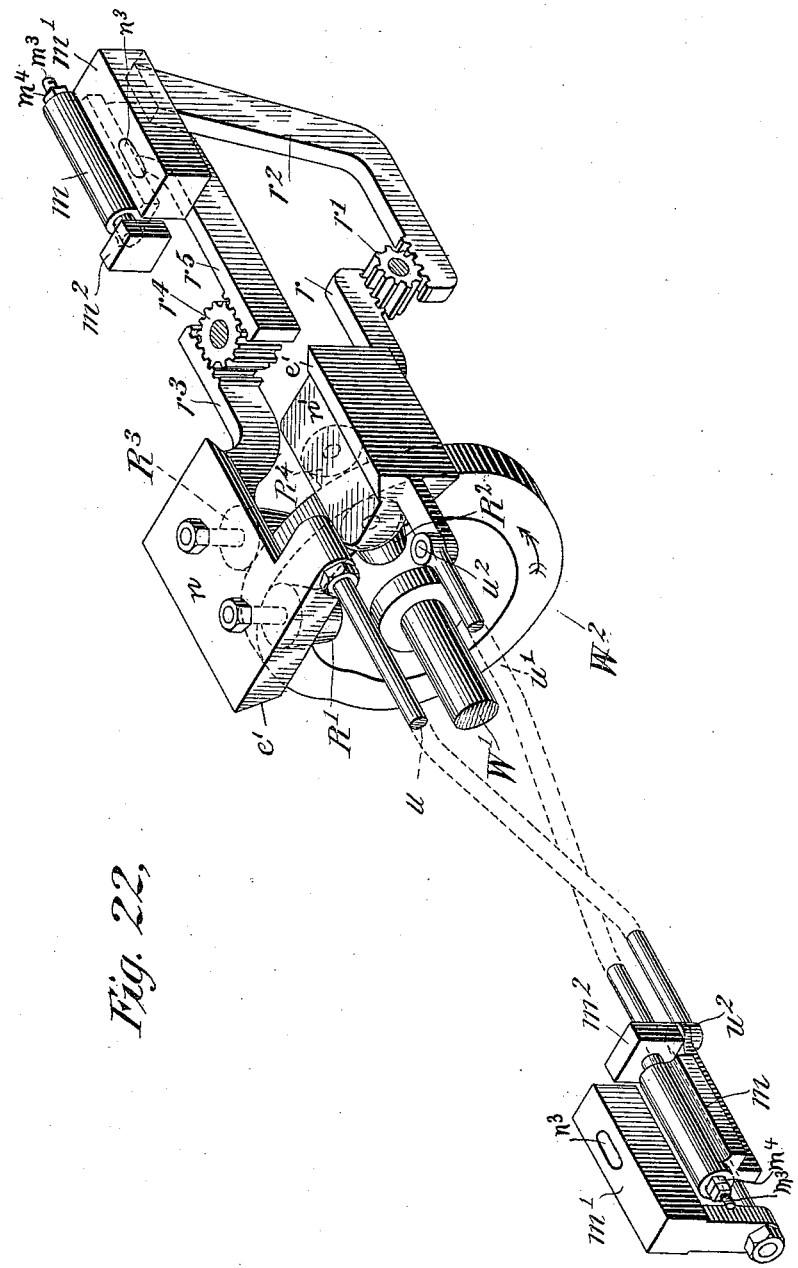

Figure 1 is a vertical section of the machine, showing the improvements in the construction of the type driver. Fig. 2 is a plan view of the type driver and feed mechanism. Figs. 3 and 4 are detail views of the specific improvement in construction of the type driver, forming the subject of the application. Fig. 5 is a vertical cross-section of the entire machine, showing the adjustment of the raceways, the device for positively throwing down the feeler hooks, and the adjustment of the channel grooves. Fig. 6 is a plan view of the raceways. Fig. 7 is a vertical cross-section through the plunger mechanism which drives the carriers crosswise. Fig. 8 is a plan view of the same plunger mechanism shown in Fig. 7. Fig. 9 is a detailed view of the plunger itself. Fig. 10 is an elevation of the mechanism for driving the carriers longitudinally in the raceways. Fig. 11 is a partial plan of the driving mechanism shown in Fig. 10, Fig. 12 is an end view on the line 12—12 of Fig. 11, and Fig. 13 is a detail view of the rollers shown in Fig. 10. Figs. 14 to 21, inclusive, are diagrammatic views of the operation of the plunger mechanism. Fig. 22 is a perspective view of the mechanism which actuates the plunger mechanism.

Similar letters refer to similar parts throughout the views.

The particular type of type-distributing machines to which the present inventions are applicable, is that class of type-distributing machine which distributes type automatically from a column into the separate channels of a case, in which they are so arranged as to be ready for use in an automatic type-setter. This type of machine performs a series of operations by which the aforesaid result is produced. First, by means of automatically acting mechanism a line of types is separated from the column of which it forms a part, from its place on a table or galley, and is then by itself presented to the action of the machine for distribution; secondly, a single type is separated from the end of the line and forced into the hold of a traveling carrier, which receives it and transports it away from the point of reception—giving place to another carrier, which in its turn repeats the movement; thirdly, the types thus held in these carriers are moved along step by step, resting at each step within separate and independent carriers, and while at rest within the carriers are subjected to the contact of feelers—of which there are as many as there are denominations of type to be distributed—which, by suitable mechanism, are caused to be brought against the exposed edges of the type, and which ascertain the denominations of the type by entering, or failing to enter, notches cut into the edges of the type in different positions and different combinations for different denominations of type; fourthly, when a type is brought in front of a feeler whose projections match the notches cut in its edge, a hook, moving with the feeling apparatus, is allowed to fall and catch a sliding ejector in the carrier, against which the type is supported, and as the feeling apparatus is withdrawn the hook pulls the sliding ejector forward and thus forces the type from the carrier and permits it to enter the mouth of a conductor, through which it drops into the appropriate one of a series of channels placed at the bottom ends of the type conductors. A machine of this character is necessarily a more or less complicated mechanism, and as the same operates automatically, a large number of parts are moving at the same time, some of them at a high rate of speed. As a result thereof, if any of them become worn, they have to be replaced, and as they become worn they impede the proper action of the machine and diminish its efficiency.

The object of the present invention is primarily to obviate these objections, and secondly to substitute more positive and more efficient forms of mechanism for driving certain portions of the machine.

In Fig. 1, W' is the driving shaft of the machine; V², the cam which actuates the type driver $p^2$ by means of the lever arm Y, and B is the page table upon which a page of type is placed. J' is the page follower sliding upon the rod J²; $d'$, a button, to which is attached a cord, which passes over a loose pulley K², and to the end of which a weight is attached whereby the page follower J' will be kept continuously pressed against the page of type, thus moving it forward as it is removed by the type raiser, line by line. S is the line follower, provided with a button $c^2$, connected with a cord $c$, passing over a pulley $c'$, upon the frame of the machine, and attached to a weight by means of which the line follower S is kept constantly pressed against the line of type $t$, so forcing it forward as the letters are picked off one by one. $s'$ and $s^4$ are cylinders placed upon the frame of the machine, containing spiral springs, which are adjusted by the set screws $s^2$ and $s^3$, so as to form impact points for the lever arm Y', which limit the stroke of the type-driver $p^2$. S is a lever which is actuated by suitable mechanism and which operates to throw back the type follower S, when the line of type has been exhausted, so that it may begin to operate upon the next line, which will have been pushed forward by the page follower J'. N is the adjustable side of the page table B, regulated by the thumb screw $s^5$; N', the adjusting rule. T is the line raising mechanism which raises the front line of type from the page, as soon as it reaches the face of the page table. $t$ is the line of type presented to the type follower. $t'$ is the last letter at the end of the line. M and M' represent the carriers. The various details of these portions of the mechanism have all been fully described in the aforesaid Letters Patent.

In the ordinary form of type driver as heretofore used in the machines constructed in accordance with said Letters Patent, the front edge of the type driver picks off from the advancing line of type a single letter at a time, and carries the same forward, in the type finger, and forces the same into the clutch of the carrier M, which is advanced by the carrier plungers so as to be opposite thereto, which clutch is opened by a stud placed on the end of the plunger, against which the plunger throws the type carrier when it is moved into line. The forward edge of the type driver becomes gradually worn from the impact, and as a result the same fails to act properly upon the first letter of the line and to pick off the same as it should. Consequently the letter is improperly grasped and is delivered to the carrier sometimes in an oblique or slanting position, and is therefore not properly presented to the feeling mechanism. To obviate this difficulty, I provide, upon the front edge of the type driver, a beveled tongue or face piece, $p^3$, of the character shown in Figs. 3 and 4, which is cut to fit corresponding indentations upon the front edge of the type driver $p^2$. This tongue is held in place by the screw $p^4$, Figs. 3 and 4, and may be readily removed by unscrewing the same. This face plate, $p^3$, may be made of tempered steel, and be removed and replaced from time to time as it becomes worn, without taking out the type driver, which is a great advantage, and in this way the front edge of the type driver can always be made to oppose a hard flat surface to the end letter of the advancing line of type, without stopping the machine any appreciable length of time.

The mechanism for controlling the type on the galley is the same as that described in previous patents, and need not be referred to further. This wear plate is not shown in Figs. 1 and 2, on account of the smallness of the scale, but taking these figures in connection with Figs. 3 and 4, its function and utility will be at once apparent.

In the previously constructed machines, a certain difficulty has been experienced in moving the carriers longitudinally in the raceways, owing to the fact that as the carriers become worn they do not correspond with the channel in the front plate leading to the case, and they also slide in the raceway and rattle, and are apt not always to retain their parallelism. In order to adjust the size of the raceways to the carriers, from time to time, as they become worn, I construct the raceways as shown in Figs. 5 and 6, out of movable plates $M^2$ $M^2$, which hold the carriers M and M' in the manner shown in Fig. 5. These plates are provided with slots, through which pass suitable screws, $M^3$, which screw down into screw openings in the bed plate A. By turning the screws $M^3$ $M^3$, the raceways $M^2$ $M^2$ can be loosened and then be moved or shifted laterally in and out, upon the slots, and thus fitted to the carriers as the latter, or the grooves in raceways themselves, become worn. It is also desirable that the back plate F of the plate, containing channels or grooves, K, through which the type passes, on being ejected from the carrier to their proper compartment in the case under the machine, should also be provided with an adjustment which will enable a continuous surface to be formed and preserved between the front face of the plate F and the front edge of the raceway, $M^2$. This is accomplished by attaching the plate F, containing the grooves K, to a horizontal plate A', Fig. 5, which is arranged to slide upon a stud, $a$, on the bottom of the bed plate A, and is moved laterally by the bolt $A^2$ passing through the stud $a$, as shown in Fig. 5. By rotating this bolt $A^2$, the plate A' and with it the plate F is moved to the right or the left, and as a result the front surface of the raceway $M^2$ is made continuous with the surface F at the point $x'$, if the line of continuity for any reason becomes broken. The plate A' is supported in any convenient manner, under the bed plate A.

A further part of my improvement consists in providing mechanism which, when the feeler hooks H, actuated in the manner shown in the aforesaid patents, drop and engage with the ejector in the carrier, will operate to positively prevent any hook thus falling from tripping or slipping up and loosening its hold upon the ejector, until after the feeling mechanism has operated. This is part of the improvement shown in Fig. 5. Here Z is the bed plate, on which the feeler mechanism operates; $Z^2$, the sliding bar actuating the feelers, and Z' the series of bearings in which the feeler hooks H H are pivoted. H is the feeler hook, and a spring $h$ is provided, for each hook placed as shown in Fig. 5, upon a rod, $h^2$, just back of each hook. This rod is pivoted as shown, and is turned by a lever bar $h'$, which is actuated by an arm, $i$, connected by a horizontal rod, $i'$. A roller, V, is provided upon the main driving shaft of the machine, having a cam, $v$, on its periphery which engages with a roller, $i^2$, on the rod $i'$. This rod $i'$ slides in a suitable bearing, and is kept against the roller V by the spring $i^3$, and when the cam $v$, by the revolution of the roller, comes in contact with the roller $i^2$, it causes the rod $i'$ to slide to the left, thereby moving the arm $i$, and throwing the lever $h'$ from right to left, which in turn causes the spring $h$ to come in contact with the upper surface of the feeling hook and hold it down for an instant until the cam $v$ is released. Thereupon the spring $i^3$ moves the rod $i'$ back to its normal position, raising with it the spring $h$. The roller V is of such size, and the cam thereon is so arranged that it will operate to slide the lever $i'$ only at the instant when the feeler hooks H are dropped over the ejector and just at the moment when they come in contact with the ejector. A similar spring device is arranged behind each feeler hook throughout the row, and the arrangement of the cam is such that the spring has no effect except upon that particular feeler hook which drops and clutches the ejector, which of course takes place when the particular feeling mechanism has selected the proper letter.

A further part of my invention is the improvement in the construction of the plunger mechanism for throwing forward the carriers as they reach the end of the raceway, which is designed to obviate the difficulty experienced in the existing machines, in which the arrangement of the plunger mechanism was such that, when the plunger became worn, it could not readily be replaced without taking that section of the machine apart. The object of the present improvement is to provide the end or tooth of the plunger with a removable or interchangeable face piece which may readily be removed and changed. This is accomplished by constructing the end of the plunger O with a mortised slot or tenon, as shown in Fig. 9, into which fits a tooth, $o^8$. This tooth is held in position by the pin $o^9$. The plunger O is pivoted as before at $o^7$, and is actuated by the sliding bar $o^2$, which in turn is operated by the lever Q moved by the cam groove $V^4$ formed in the cam roller $V^5$ on the main driving shaft W' of the machine. This tooth is made of extra tempered steel, and may be readily removed and replaced without removing the plunger O. The rock bar Q is pivoted to the frame of the machine at $Q^3$, and a spring $Q^2$ is provided, attached at one end $Q^4$ to the frame of the machine, engaging at its opposite extremity with the block $o^5$ over which falls the hook of the tripping lever $o^4$ pivoted at $o^3$ to the rocking bar Q. The spring $Q^2$ engages with the block $o^5$ so as to hold it against the rock bar Q. The spring Q rests also against the surface of the roller $V^5$. The bar Q carries a roller $Q'$, which runs loosely in the cam groove formed between the surface $V^4$ and the surface of $V^5$ of the roller $V^6$ on the shaft W. As the roller $V^5$ rotates, the cam groove throws the rock bar forward and backward, once in each revolution, moving therewith the sliding plunger bar in and out. If for any reason the plunger bar $o^2$ gets caught so it cannot move, the lever $o^4$ is tripped off of the block $o^5$, and the rock bar Q ceases to push the plunger bar forward and backward and until the shaft is stopped it merely slides the block $o^5$ forward and backward on the pin $o^7$ until the normal conditions are restored.

A further part of the invention is the arrangement of the plunger mechanism for the purpose of moving the carriers laterally in their raceways. A great difficulty experienced in the existing machines is the pounding or hammering of the carriers in their lateral passage through the raceways, particularly as they reach the end of a line. The object of this mechanism is to avoid this difficulty, by moving up the end blocks to meet the carriers and then moving up the carriers in one continuous solid line, and then releasing the line so as to permit the plunger O to operate on the end carrier, when the line is released. This is accomplished by automatically withdrawing the holding block at one end of the line of carriers, before the plunger at the other end of the line operates to shift the line, and then closing up the line before moving the same as a whole, and imparting to the closed line a constant movement or intermittent movement for such intervals as may be necessary to enable the feelers to perform their proper functions, thereby avoiding the hammering and pounding of the carriers at the end of the raceways.

Fig. 10 shows an elevation of the mechanism for driving the carriers through the raceways, and Fig. 11 is a partial plan of the same mechanism shown in Fig. 10. In these two figures, $W'$ is the driving shaft, and $W^2$ is a double bevel edged bent cam roller fastened to the shaft by the sleeve $w$, which rotates between two pairs of rollers, $R'$ $R^3$ and $R^2$ $R^4$, the members of each pair being placed on opposite sides of the same, and arranged to rotate on the sliding bearings $n$ $n'$, as shown in Fig. 11, whereby a horizontal throw or slide movement is imparted to the sliding toothed racks $r$ $r^2$ and $r^3$ $r^5$, and to the rods $u$ and $u'$, the bearings of which slide laterally in suitable beveled seats, $e$ $e'$, upon the frame of the machine. The first pair of racks $r$ $r^2$ engage with a pinion $r'$, and the second pair of racks $r^3$ $r^5$ engage with a pinion $r^4$, and as a result an opposition motion is given to the rack $r^2$ to that given to the rack $r^5$. The first pair of racks $r$ $r^2$ are connected with a block $m'$ at one end of one raceway, which they move longitudinally backward and forward, and the second pair of racks is connected with a plunger $m^2$, which they move longitudinally forward and backward at the same end of the other raceway. Each pair of racks thus operates two plungers, at opposite ends and on the opposite side of the raceway. The ends of the bed plate A are provided with the slots $n^4$ $n^5$, Fig. 6, to permit of the proper motion of the plungers and blocks $m$ and $m'$. The rods $u$ and $u'$ are moved directly from the racks connected with the rollers $R'$ $R^3$ and $R^2$, $R^4$ and in an opposite direction from the racks $r^2$ and $r^5$. The details of arrangement of these mechanisms are shown in Figs. 10 to 13 inclusive and also in Fig. 22.

The roller $R'$, which is driven inward directly from the cam $W^2$, engages, through the rod $u$, with a block, $m$, at one end of the raceway, and which closes up the end of the line of carriers M; and the rack $r$, which is driven from the cam, by the roller $R^4$, engaging, through the pinion $r'$, with the second rack $r^2$, is driven outward at the other end of the other raceway. The same operation takes place by the movement of the roller $R^2$ upon the rod $u'$, and the movement of the roller $R^3$ on the rack $r^3$.

For the purpose of preventing any injury to the plunger mechanism, in case the line of carriers, for any reason, becomes blocked and ceases to move, there is attached to the block $m^2$, Fig. 8 and Figs. 14 to 21, inclusive, a rod $m^3$ passing through a cylinder $m$, and a screw nut $m^4$ is pivoted screwing down over the end of the rod $m^3$. The cylinder $m$ is attached at one end to the extremity of the rod $u$ and at the other end, in the case of the other line, to the rack $r^5$. The result of this construction is such that if for any reason the carriers become blocked, the blocks $m^2$ being thrown forward by the plunger mechanism, will simply press the spring within the cylinder $m$ and prevent any injury to the line of carriers. The rods $u$ are held in position at the outer ends by means of a stud $n^2$ Fig. 11, which is placed in a slot on the bed plate of the machine in the manner shown in that figure.

A handle $m^5$ is pivoted, as shown in the various views, for the purpose of releasing the block $m^2$ in case of any sticking of the parts. It is pivoted in the manner indicated, and is simply thrown down and when released permits the rod $m^3$ within the cylinder $m$ to slide back into the cylinder. The block $m'$ is provided with an opening and is covered with a plate $M^3$ which is provided with a handle M² which screws down into a corresponding opening into the bed-plate A', through the opening in the manner shown in Fig. 13, thereby not impeding the lateral motion of the block m', and in this manner protects the pusher mechanism at the top. The result of this movement is such that as the block m' moves forward in one raceway, the block at the other end of the other raceway moves forward in an opposite direction, and vice versa, and when the block m' moves backward at the end of one raceway, it also moves backward at the end of the other raceway a distance sufficient in each case to enable the plunger mechanism O, referred to above, to move forward and throw out of one raceway into the other raceway, a single carrier at each end of the line. After the carrier is thus thrown forward, the curve or dwell on the cam W² is so slight that no lateral motion is imparted to the rollers R', R³ and R² R⁴, and the line of carriers remains standing for a sufficient period of time to enable the type driver to throw a single letter from the line of type into the carrier. Then the cam W² commences to act again and the block m' at one end of the line is thrown forward so as to close up the separate carriers into a continuous line, and the entire mechanism is then caused to move forward laterally by the curve of the cam wheel W², so as to bring the carrier at the extreme end of the line opposite to the end of the other raceway, whereupon, a space having been prepared by the operation of the mechanism upon the line in the other raceway, the blocks recede and leave the line open, and thereupon the plunger at this end of the line throws the carrier at the extreme end of the first line into the space thus provided in the second line, and the same operation takes place in a reverse direction at the other end of the line.

The bearings for the racks are dovetailed at e' so as to slide in suitable seats, e', cut or mortised in the surface of the bed plate A, in the manner shown in Figs. 12 and 13.

I claim as my invention—

1. The combination with the bed-plate of the race ways having adjustable plates for regulating the width of the carrier channels and an adjustable back plate F, containing the type channels, a sliding plate placed under the bed plate to which said back plate is attached and means for moving the same so as to adjust it to the adjustable plates forming the race-ways, substantially as described.

2. The combination with the bed-plate of the race-ways having slotted plates for regulating the width of the carrier channels and screws whereby the slotted plates are removably and adjustably screwed, and a horizontal plate A' supported beneath the bed-plate, having a back plate and a bolt F² by which it is moved to adjust the plate to the adjustable plates of the raceways substantially as described.

3. The combination, with the feeler-hooks; of springs a lever whereby the springs are actuated, a main shaft with which the lever is connected and mechanism, whereby, when the feeler hooks fall, the springs are thrown into operation and hold down those feeler-hooks which engage with the ejector of one or more carriers when the feeling mechanism operates; substantially as described.

4. The combination, with the feeler-hooks; of the spring h, the sliding-rod t' actuating the spring, and the cam-roller V having a cam v, actuating the sliding rod; substantially as described.

5. The combination, with the raceways; of a plunger and end block in each raceway, the plunger in one raceway being arranged alongside the end block of the other raceway, and means substantially as described for moving the plunger and the end block at the end of each raceway in opposite directions, then moving the plunger and the end block in one raceway in one direction and the plunger and the end block in the other raceway in the opposite direction, and then moving the plungers in opposite directions for permitting the shifting mechanism to effect an exchange of a carrier at each end of the line; substantially as described.

6. The combination, with the raceways; of the sliding bearings, each bearing having a rack-bar and a pair of rollers, a cam-roller working between the rollers of each pair of rollers, a plunger and end block in each raceway, rods connecting the bearings with a plunger and with an end block respectively at one end of the raceways, a plunger having a rack-bar and an end block having a rack-bar at the other end of the raceways, and pinions connecting the rack-bars in pairs; substantially as described.

In testimony that I claim the foregoing as my invention I have signed my name, in presence of two witnesses, this 18th day of May, 1893.

LOUIS K. JOHNSON.

Witnesses:
EDWIN T. RICE, Jr.,
WILLARD PARKER BUTLER.